(12) United States Patent
Eckhardt et al.

(10) Patent No.: US 7,418,054 B2
(45) Date of Patent: Aug. 26, 2008

(54) TRANSMITTER ADJUSTMENT BASED ON TRANSMISSION STATISTICS

(75) Inventors: Uwe Eckhardt, Dresden (DE); Matthias Lenk, Leipzig (DE); Michael Grell, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 809 days.

(21) Appl. No.: 10/464,990

(22) Filed: Jun. 19, 2003

(65) Prior Publication Data

US 2004/0086058 A1 May 6, 2004

(30) Foreign Application Priority Data

Nov. 4, 2002 (DE) ................. 102 51 314

(51) Int. Cl.
  *H04L 27/04* (2006.01)
  *H04B 7/005* (2006.01)
(52) U.S. Cl. ................ 375/295; 375/358; 375/224; 370/245
(58) Field of Classification Search ........... 375/295, 375/224, 228, 296, 309; 370/245, 242, 241
See application file for complete search history.

(56) References Cited

U.S. PATENT DOCUMENTS

| | | | |
|---|---|---|---|
| 5,425,051 A * | 6/1995 | Mahany ............... 375/132 |
| 5,889,772 A | 3/1999 | Fischer et al. |
| 5,912,921 A | 6/1999 | Warren et al. |
| 5,924,043 A * | 7/1999 | Takano ............... 455/522 |
| 5,950,124 A * | 9/1999 | Trompower et al. ....... 455/422.1 |
| 6,069,887 A | 5/2000 | Geiger et al. |
| 6,496,543 B1 * | 12/2002 | Zehavi ............... 375/295 |
| 6,678,310 B1 | 1/2004 | Andren et al. |

FOREIGN PATENT DOCUMENTS

| | | |
|---|---|---|
| DE | 69800116 | 12/2000 |
| EP | 0863619 | 4/2000 |
| EP | 1063785 | 12/2000 |

* cited by examiner

*Primary Examiner*—Temesghen Ghebretinsae
(74) *Attorney, Agent, or Firm*—Meyertons Hood Kivlin Kowert & Goetzel, P.C.; Erik A. Heter (57) ABSTRACT

A WLAN (Wireless Local Area Network) transmitter or another data communications apparatus is provided that includes a transmission section that is configured to generate signals to be transmitted, and a control section that is connected to the transmission section to control the transmission section dependent on at least two transmission parameters. The control section comprises a state transition controller that is configured to step through a plurality of predefined control states. The control section is configured to apply different transmission parameter modification mechanisms in different control states. The state transition controller is configured to determine the respective next control states based on transmission success and failure statistics.

82 Claims, 2 Drawing Sheets

TRANSMITTER ADJUSTMENT BASED ON TRANSMISSION STATISTICS

BACKGROUND OF THE INVENTION

1. Field of the Invention

The invention generally relates to data communication transmitters such as WLAN (Wireless Local Area Network) transmitters and transceivers, and corresponding methods, and in particular to the adjustment of transmission parameters.

2. Description of the Related Art

A wireless local area network is a flexible data communication system implemented as an extension to or as an alternative for, a wired LAN. Using radio frequency or infrared technology, WLAN systems transmit and receive data over the air, minimizing the need for wired connections. Thus, WLAN systems combine data connectivity with user mobility.

Most WLAN systems use spread spectrum technology, a wide-band radio frequency technique developed for use in reliable and secure communication systems. The spread spectrum technology is designed to trade-off bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmission, the standard was extended to the 802.11b standard that allows data rates of 5.5 and 11 Mbps in the 2.4 GHz spectrum. This extension is backwards compatible as far as it relates to direct sequence spread technology, but it adopts a new modulation technique called CCK (Complementary Code Keying) which allows for realizing the speed increase.

In 802.11b compliant WLAN systems, all data rates specified in the IEEE 802.11 and 802.11b standards can be used to transmit digital data. The data rates of 1 and 2 Mbps were already possible in the 802.11 standard. The CCK related higher data rates that were introduced by the 802.11b standard, where the data rates of 5.5 and 11 Mbps.

Thus, an 802.11b compliant WLAN transmitter may select one of the above-mentioned four data rates for transmitting its signals. While choosing the highest data rate substantially increases the data throughput since choosing a higher data rate allows for transmitting more data in the same time, this mode cannot be used in all circumstances. For instance, if the present channel conditions are deteriorated by noise, signal reflections, interferences or other negative influences, the actual data throughput may be significantly less than what might be expected. This is because the error rate may increase so that signal retransmissions are required.

Another problem in WLAN systems is to choose the right transmission power. If a transmitter selects a low power level, the above signal deterioration by noise etc may still increase since the signal to noise ratio at the receiver side is decreased. However, choosing a high transmission power may not be the best choice since high power transmissions from one subscriber may then influence the signal quality of data transmissions of other subscribers. Moreover, using higher transmission powers increases the power consumption of the device what is particularly disadvantageous where the transmitter is a mobile station.

A technique for reducing the collision probability in WLAN systems and other data communication systems is the RTS/CTS (Request to Send/Clear to Send) mechanism. The exchange of RTS and CTS frames prior to the actual data frame is one way of distributing medium reservation information announcing the impending use of the medium. While this mechanism may significantly reduce the collision probability in high traffic systems it is not necessary in data communication systems where the channel quality is high. Rather, if the RTS/CTS exchange is performed in high quality systems, the data throughput is even reduced since the exchange of RTS and CTS frames increases the overall traffic volume where this mechanism is not necessary but nevertheless used.

Thus, there are a number of parameters in data communication systems which to choose may be a difficult task. As mentioned above, such parameters may be the data rate, the transmission power and the RTS/CTS threshold that indicates a frame length limit for controlling when to apply this mechanism. There may be many other parameters which need to be adjusted in data communication systems depending on the current channel situation.

In conventional data communication systems, adaptation techniques are applied that adjust one of these parameters to find an optimum and trace this optimum. However, such techniques usually work on only one of these parameters so that multiple mechanisms are required to optimizes all the different aspects mentioned above. This leads to a significant amount of control circuitry necessary to implement such mechanisms, and thus increase the circuit development and manufacturing costs.

Moreover, even when implementing different optimization techniques that each relate to a different one of the above mentioned parameters, there are no synergy effects since the individual optimization techniques would operate completely independently from each other. Moreover, such cumulative optimization mechanisms tend to exhibit instabilities which may occur since controlling one mechanism will somehow influence the conditions that form the basis of controlling another mechanism.

SUMMARY OF THE INVENTION

An improved transmission adaptation technique in data communication systems is provided that may operate more efficiently, reliably and stable.

In one embodiment, a WLAN transmitter is provided that comprises a transmission section that is configured to generate signals to be transmitted, and a control section that is connected to the transmission section to control the transmission section dependent on at least two transmission parameters. The control section comprises a state transition controller that is configured to step through a plurality of predefined control states. The control section is configured to apply different transmission parameter modification mechanisms in different control states. The state transition controller is configured to determine the respective next control states based on transmission success and failure statistics.

In another embodiment, there may be provided a data communications apparatus that comprises a transmission section that is configured to generate signals to be transmitted, and a control section that is connected to the transmission section to control the transmission section dependent on at least two transmission parameters. The control section comprises a state transition controller that is configured to step through a plurality of predefined control states. The control section is configured to apply different transmission parameter modification mechanisms in different control states. The state transition controller is configured to determine the respective next control states based on transmission success and failure statistics.

In a further embodiment, an integrated circuit chip for use in a data communications transmitter comprises a transmission circuit that is configured to generate signals to be transmitted, and a control circuit that is connected to the transmission circuit to control the transmission circuit dependent on at least two transmission parameters. The control circuit comprises a state transition control circuit that is configured to step through a plurality of predefined control states. The control circuit is configured to apply different transmission parameter modification mechanisms in different control states. The state transition control circuit is configured to determine the respective next control states based on transmission success and failure statistics.

In still another embodiment, there is provided a method of operating a data communications device for transmitting data. The method comprises controlling the generation of signals to be transmitted, based on at least two transmission parameters. The control comprises stepping through a plurality of predefined control states, applying different transmission parameter modification mechanisms in different control states, and determining the respective next control states based on transmission success and failure statistics.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrated embodiments of the present invention will now be described with reference to figure drawings.

Figure 1:
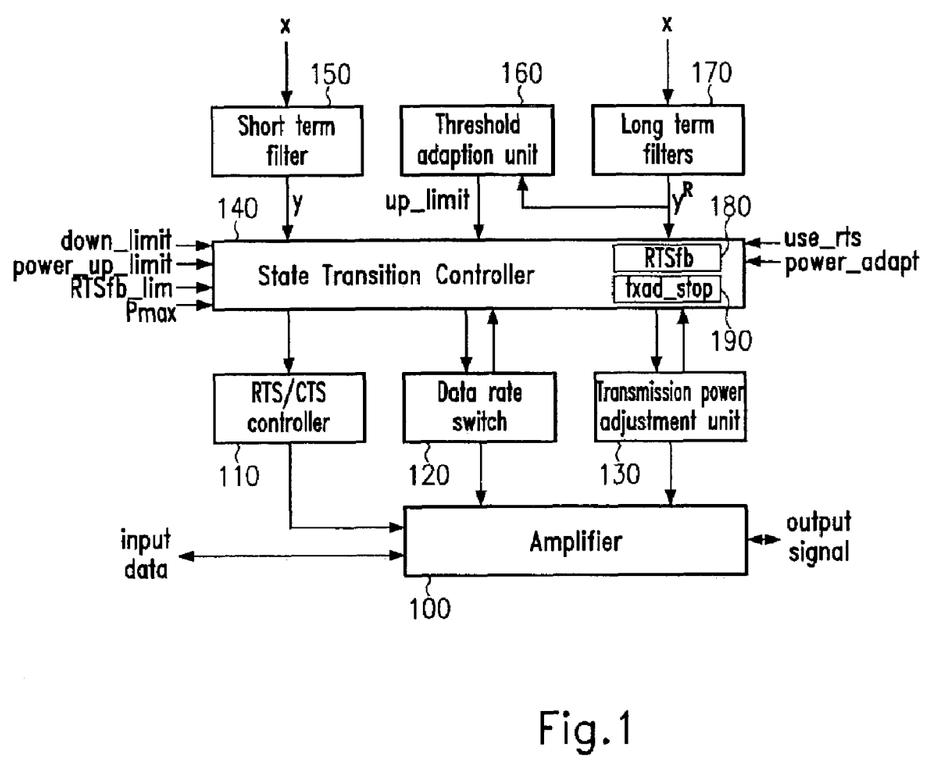
FIG. 1 is a block diagram illustrating the components of a transmission parameter adaptation device for use in a data communication transmitter according to an embodiment.

Referring now to the drawings and particularly to FIG. 1, components of a WLAN transmitter or transceiver according to an embodiment are shown. As will be discussed in more detail below, the embodiments apply an adaptation algorithm to adjust the data rate, the transmission power, and/or the RTS/CTS threshold based on transmission statistics. While the present embodiments relate to WLAN systems, it is to be noted that other data communication systems may also make use of the described adaptation technique. In addition, embodiments exist where only two of the three mentioned parameters are adjusted by the adaptation technique or where some or all of the parameters may be temporarily disabled.

As can be seen from FIG. 1, an amplifier 100 is provided that receives input data and outputs an amplified signal. The amplifier 100 may further receive an RTS/CTS activation signal from RTS/CTS controller 110 to transmit these frames if the RTS/CTS mechanism is enabled. The amplification gain may be controlled by the transmission power adjustment unit 130 to control the output power.

The amplifier 100 may act as or be a part of a transmission section of the transmitter or transceiver. In one embodiment, the transmission section may be used for transmitting data whereas a reception section is used for receiving data. In another embodiment, the amplifier 100 (or its transmission section) may be a network interface card (NIC).

As apparent from the figure, the input and output data lines may be bidirectional for connecting to higher network layers and to the transfer channel. The amplifier 100 of the present embodiment is arranged to operate at any 802.11b compliant data rate, i.e., in the BPSK (Binary Phase Shift Keying), QPSK (Quadrature Phase Shift Keying), CCK-5.5, and CCK-11 mode. It is to be noted that the available data rates may in other embodiments be restricted to only a subset of these rates. Moreover, data communication transmitters in non-WLAN systems may chose data rates that are not within the above set.

The data rate actually used by amplifier 100 is chosen based on a control signal received from the data rate switch 120. The data rate switch 120 of the present embodiment is the unit that issues the respective switch signals.

While the RTS/CTS controller 110, the data rate switch 120, and the transmission power adjustment unit 130 are depicted in FIG. 1 as separate blocks, it is to be noted that these units may be implemented in other embodiments by means of one signal circuit only. Moreover, the units 110, 120, 130 may even be incorporated in the amplifier 100 or in other modules of the transmitter.

As can be seen from FIG. 1, there is further provided a state transition controller 140 that controls the RTS/CTS controller 110, the data rate switch 120, and the transmission power adjustment unit 130. The state transition controller 140 of the present embodiment may be a finite state machine that is clock driven and frame based and that steps from one predefined state to another predefined state in a predetermined manner, following transition rules which may be hard coded or software based.

The state transition controller 140 of the present embodiment receives input values y and $y^R$ to determine the next state which is to be to stepped to. Further, the state transition controller 140 receives control variables down_limit, power_up_limit, RTSfb_lim, and Pmax to control the transitions. These parameters may be pre-set and may be retrieved from read-only registers.

Further, the state transition controller 140 may receive adjustable parameters for deciding how to step through the states, i.e., parameters that are not fixed. For instance, the parameter up_limit may be received from a threshold adaptation unit 160, and this parameter is updated depending on the current channel situation.

As may be further seen from FIG. 1, the state transition controller 140 may additionally receive control switches to enable or disable operational features of the adaptation technique. Such control switches may be the use_rts and power_adapt signals.

Moreover, the operation of the state transition controller 140 may depend on internal variables that may be set and updated by the state transition controller 140 when stepping through the states. Examples of such internal variables may be RTSfb and txad_stop stored in registers 180, 190 of the state transition controller 140.

While the numerous variables, parameters, adjustable parameters, control switches and internal variables used by the state transition controller 140 of the present embodiment have been indicated so far without explaining in more detail the functionality behind these items, the following more detailed discussion will give insight into the peculiarities of the respective adaptation technique according to the embodiments.

Turning first to the variables y and $y^R$, five low pass filters on transmission statistics are provided, four long term filters 170 and one short term filter 150. All the low pass filters 150, 170 receive an input value x(k) of +1 if the transmission attempt of frame k was successful, and −1 if the transmission failed. The value x thus indicates transmission statistics on which the adaptation technique is based.

In the present embodiment, the value x may be input from the above-mentioned network interface card or reception section.

Figure 2:
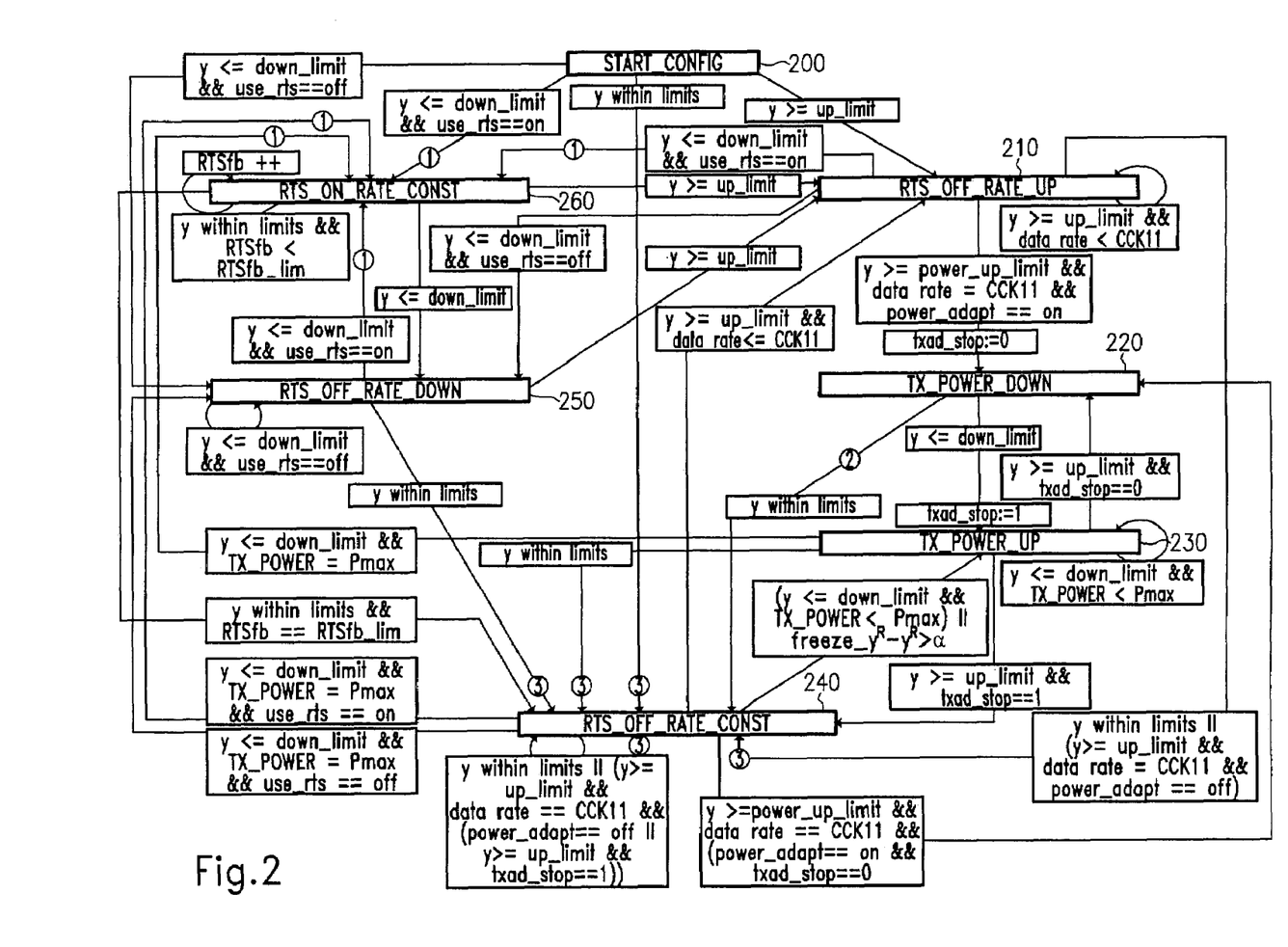
FIG. 2 is a state transition diagram illustrating the control mechanism performed by the state transition controller that is a component of the device shown in FIG. 1.

The short term filter 150 outputs for each input value x an output value y according to the following equation:

$$y(k)=c \cdot x(k)+d \cdot y(k-1)$$

where c and d are constant values. In the present embodiment, the short term filter 150 is reset at each state transition except of individual transitions that have been preselected for not resetting the short term filter 150. The preselected transitions will be specifically pointed to when discussing FIG. 2.

The long term filters 170 also receive the transmission statistics value x but output long term filter values $y^R$ where R denotes one of the different data rate modes, i.e. BPSK, QPSK, CCK-5.5, and CCK-11. The long term filter value $y^R$ is not reset at each state transition but continuously develops in time. Similar to the above equation describing the short term filter, the long term filter values $y^R$ are calculated based on the following equation:

$$y^R(k)=a \cdot x(k)+b \cdot y^R(k-1)$$

where again, a and b are constant values.

It is to be noted that the constant values a and b may be the same for each data rate mode R or may differ from mode to mode. Further, the constant values a and b may be chosen to be different from the constant values c and d.

It is to be noted that the short and long term filter values y, $y^R$ of the present embodiment are chosen to grow with the transmission statistics value x. Thus, since the transmission statistics value x at a successful transmission is greater than the corresponding value at a transmission failure, higher short and long term filter values y, $y^R$ indicate better channel conditions.

Before discussing in more detail the state diagram of FIG. 2, a synopsis is provided for explaining the various variables and parameters mentioned above.

The parameters up_limit and down_limit denote upper and lower data rate switching thresholds to which the short term filter value y is compared to determine whether the data rate needs to be adjusted. More specifically, if the short term filter value y exceeds the parameter up_limit, this indicates that it might be favorable to increase the data rate. Similarly, if the short term filter value y is below the value of parameter down_limit, this might indicate that it would be helpful to decrease the data rate.

While the lower switching threshold down_limit is a constant parameter in the present embodiment, the parameter up_limit may be adjusted based on the long term properties of the data communications channels. More specifically, the present embodiments make use of an upper limit for switching the data rate according to the following equation:

$$\text{up\_limit}=g+y^R(k)$$

where g is a constant. For this purpose, the threshold adaptation unit 160 receives the long term filter value $y^R$ from the respective long term filter 170 for calculating the switching threshold. It is to be noted that the switching value adaptation may cause a stabilization of the data rate selection during run time.

The transition controller 140 further receives the constant parameter power_up_limit that may be used similar to the parameter up_limit but which is intended to control the transmission power adaptation rather than the data rate adaptation. In the present embodiment, the value of parameter power_up_limit is chosen to be greater than the value of parameter g. If the current short term filter value y exceeds the value of the parameter power_up_limit this may be an indication to decrease the transmission power.

Another parameter received by the state transition controller 140 is Pmax which is the maximum transmission power that the amplifier 100 can provide.

Moreover, the state transition controller 140 receives the parameter RTSfb_lim which is a fallback limit for controlling the RTS/CTS mechanism. The state transition controller 140 stores in register 180 an internal variable RTSfb which is incremented each time the transmitter enters a state or remains in such a state where the RTS/CTS mechanism is activated. If the variable RTSfb exceeds the fallback limit RTSfb_lim, then the RTS/CTS mechanism is deactivated to see if it is still necessary to avoid collisions. The fallback technique therefore advantageously prevents the transmitter from keeping the RTS/CTS mechanism active and wasting traffic volume if the channel conditions were good enough to operate the transmitter without having activated this mechanism.

As apparent from FIG. 1, the state transition controller 140 stores a further internal variable txad_stop in register 190. This variable will be suitably set and unset by the state transition controller 140 to avoid instabilities in controlling the transmission power. This will be more apparent from the discussion of FIG. 2 below.

Finally, FIG. 1 shows that the transition controller 140 receives two control switch signals use_rts and power_adapt. These control switches are used to enable or disable the RTS/CTS threshold adaptation and the transmission power adaptation mechanisms, respectively. This allows the state transition controller 140 to simultaneously adapt each of the data rate, the RTS/CTS threshold, and the transmission power, or adapt only a subset of these parameters.

Turning now to FIG. 2 which is a state diagram illustrating in more detail the process of performing the adaptation algorithm according to the embodiments, there are seven states 200-260 which the transmitter can enter. After switching on the transmitter, or performing a reset, the transmitter starts at state 200 with a default configuration. Dependent on the value y of the short term filter 150, the state transition controller 140 will then step to one of the states 210, 240, 250 and 260. The state transition controller 140 may then step from state to state with the exception of state 200 that cannot be reached anymore. Thus, the available states that can be entered when continuing the transmitter operation, are states 210-260. These states will now be explained in more detail.

In state 210, the RTS/CTS threshold is set to a default value while the data rate is switched to the next higher data rate, if possible. In the present embodiment, the default value for the RTS/CTS threshold is chosen to be 2346, i.e., the maximum frame length plus one. Since the RTS/CTS threshold is actually a frame length limit which needs to be reached or exceeded by the current frame to have RTS frames transmitted, no RTS frames will be sent if a threshold is set to the default value. This is because no frame can exist that has a frame length greater than the default value. That is, setting the RTS/CTS threshold to the default value means to (temporarily) deactivate the RTS/CTS mechanism.

The state 220 is a state where the transmission power is decreased, whereas the data rate is kept constant and the RTS/CTS threshold set to its default value. Likewise, the state 230 increases the transmission power while keeping the data rate constant and setting the RTS/CTS threshold to its default value. Increasing or decreasing the transmission power may be done in 3 dB steps.

In state 240, the RTS/CTS threshold is again set to the default value, thus disabling the RTS/CTS mechanism. Further, the data rate is kept constant, and no transmission power adaptation takes place.

The state 250 substantially corresponds to state 210 but is the state where the next lower data rate is selected, if possible. Finally, the state 260 is the state where the RTS/CTS mechanism is activated by setting the RTS/CTS threshold to a suitable value. The data rate is kept constant.

As apparent from FIG. 2, each of the states 210-260 may be potentially stable states, at least for a given period of time. For instance, if the short term filter value y is equal to or greater than the value of parameter up_limit and the data rate is not yet at its maximum, the state 210 may be repeatedly entered to even more increase the data rate. Similarly, the state 230 may be stable as long as the short term filter value y is less than or equal to the value of parameter down_limit and the transmission power has not yet reached its maximum Pmax. Likewise, the state 240 may be continuously held if the short term filter value is within its limits or is beyond its limits but any data rate or transmission power adaptation is disabled. The state 250 will not be left as long as the short term filter value y is at least as low as the value of the parameter down_limit and the RTS/CTS mechanism is disabled. Finally, the state 260 may be stable as long as the short term filter value y is within its limits and also the internal variable RTSfb is below its failback limit, where the internal variable is repeatedly increased in state 260.

While the state 220 is not shown in FIG. 2 as being a stable state, embodiments exist where the state 220 may be repeatedly populated.

Beginning with the start configuration in state 200, the short term filter value y is checked to be within or beyond the limits specified by parameters up_limit and down_limit. If the filter value is above up_limit, state 210 is entered. If it is within the limits, the state transition controller 140 proceeds to state 240. If however the filter value is below the value of the parameter down_limit, the state 260 is entered if the RTS/CTS mechanism is activated, and state 250 is entered otherwise. When entering state 260, the internal variable RTSfb stored in register 180 is reset to zero, as indicated by marking the transition with an encircled number 1.

If the short term filter value y exceeds the value of parameter up_limit, this is generally an indication of quite good channel conditions. As already mentioned above, the short term filter value y is linearly dependent on the transmission statistics value x which is +1 if a transmission attempt has succeeded, and −1 otherwise. Thus, if the short term filter value y exceeds the data rate adaptation upper limit up_limit, the state 210 can be entered to increase the data rate, if possible. If the short term filter value y falls below the value of parameter down_limit after having increased the data rate, the state transition controller 140 will step to state 260 or 250 dependent on whether the RTS/CTS mechanism is activated. If however the highest data rate is already reached and the power adaptation mode is activated, and if the short term filter value y does not only exceed the value of parameter up_limit but also the value of the parameter power_up_limit, the state transition controller 140 will step from state 210 to state 220 since the channel quality is good enough to decrease the transmission power. As shown in FIG. 2, the internal variable txad_stop is set to zero when entering state 220.

When having entered state 220, the short term filter value y is checked to be within or without the limits, similar to the procedure described above. If the short term filter value y is within the data rate adaptation limits, the state transition controller 140 steps to state 240. At the transition that is indicated in FIG. 2 by the encircled number 2, the internal variable freeze_$y^R$ is set to the current value of the long term filter $y^R$.

If starting from state 220, the short term filter value y is equal to or lower than the value of parameter down_limit, the state transition controller 140 will enter state 230 to increase the transmission power. When entering state 230, the state transition controller 140 will set the internal variable txad_stop to the value of one to control what will happen if the short term filter value y should exceed even the value of up_limit in state 230. As can be seen from FIG. 2, if the short term filter value y exceeds that parameter, the process will step from state 230 to state 220 if the internal variable txad_stop is zero. Otherwise, the state 240 will be entered. Thus, the variable txad_stop is used to prevent the system from toggling between states 220 and 230.

If the state transition controller 140 has controlled the transmitter to enter state 240, it is checked whether the long term filter value $y^R$ differs from the previously stored freeze value by a predefined amount α. If so, the controller 140 will step from state 240 to 230. The same step will be performed if the short term filter value y is equal to or below the parameter down_limit and the current transmission power has not yet reached its maximum Pmax.

If in state 240, the short term filter value y is equal to or above the value of parameter power_up_limit, and if the data rate is at its maximum value (i.e. that of the CCK-11 mode), and if further the power adaptation mechanism is enabled, the state transition controller 140 will step to state 220 if the value of the variable txad_stop is zero.

If the short term filter value y in state 240 is equal to or below the value of parameter down_limit and the transmission power is at its maximum Pmax, the process will continue with state 250 or 260, depending on whether the RTS/CTS mechanism is enabled. When entering state 250, the short term filter value y is checked to be within or without the data rate adaptation limits, and state 240 may be entered if it is within the limits. If however the short term filter value y is equal to or above the upper limit, the state transition controller 140 will step to state 210. If it is equal to or below the lower limit, the state 250 will be kept active if the RTS/CTS mechanism is turned off, and state 260 will be entered otherwise.

As mentioned above, state 260 is the RTS/CTS mode state and will be kept active at least until the fallback limit is reached. If however in state 260, the short term filter value y is equal to or above the data rate adaptation upper limit, the process will step to state 210. If the short term filter value y is equal to or below the lower limit, the process will continue with state 250. That is, if the short term filter value y leaves the data rate limits, the RTS/CTS mechanism will be turned off and the data rate will be adapted.

Finally, it is to be mentioned that the power adaptation states 220, 230 and the data rate adaptation states 210, 250 are states that are not populated for a long time. If starting from these states, the short term filter value y comes within its limits so that the state transition controller 140 will be controlled to enter state 240.

Given the above description of the embodiments, a transmission technique is provided where one, two or all of the following parameters are adjusted according to transmission statistics: the data rate, the RTS/CTS threshold, and the transmission power. This is done by using error filters 150, 170, and an additional adaptation stability is achieved by varying the upper switching threshold up_limit. It is to be mentioned that in other embodiments, further parameters may be introduced, and all of the presently discussed and the additional parameters may be made dependent on the current statistics.

By using the above described technique, the lowest possible transmission power can be selected at any one time. Further, the MAC (Medium Access Control) transmission parameters RTS/CTS threshold and data rate can be adapted to currently existing WLAN conditions. It is to be noted that the technique may nevertheless apply to other data communications system than WLAN systems.

Moreover, by using the above described adaptation technique, a maximum network throughput can be achieved at the lowest possible transmission power. Further, RTS/CTS protection is ensured even at appearing hidden nodes. Further, the RTS/CTS fallback is ensured at disappearing hidden nodes. Moreover, it is ensured that the transmission power reduction will not take place until the carrier sensing threshold is reached, to avoid hidden nodes.

The above described technique according to the embodiments advantageously achieves synergetic effects by providing a unique mechanism that combines the adaptation of multiple transmission parameters. For instance, while limits are given for controlling given adaptations, the embodiments are not restricted to adapt the respective transmission parameter even if one of its limits is exceeded. Rather, another parameter may be adapted instead to achieve a more stable and reliable control. For instance, if starting from state 240 and having a short term filter value y that exceeds the upper data rate limit up_limit, the state transition controller 140 may decide in some cases to increase the transmission power rather than the data rate, and will then step to state 230 rather than state 210. Thus, the technique of the embodiments is an in-depth mixture of multiple adaptation techniques leading to better adaptation results than just using multiple individual separate mechanisms.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. For instance, whenever a transmitter was mentioned in the above description, it is to be understood that this term may relate to any transmitting device including transceivers.

In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) transmitter comprising:
   a transmission section configured to generate signals to be transmitted; and
   a control section connected to said transmission section to control said transmission section dependent on at least two transmission parameters, said control section comprising a state transition controller configured to step through a plurality of predefined control states, wherein said at least two transmission parameters comprise an RTS/CTS (Request to Send/Clear to Send) threshold value to be used for determining whether or not to activate an RTS/CTS mechanism, and at least one of said transmission parameter modification mechanisms is an RTS/CTS threshold adaptation mechanism,
   wherein said control section is configured to apply different transmission parameter modification mechanisms in different ones of the plurality of predefined control states, and
   wherein said state transition controller is configured to determine a respective next one of the plurality of predefined control states based on a value indicative of whether a transmission attempt has succeeded or failed.

2. The WLAN transmitter of claim 1, wherein said at least two transmission parameters comprise a transmission data rate and at least one of said transmission parameter modification mechanisms is a data rate adaptation mechanism.

3. The WLAN transmitter of claim 2, wherein said data rate adaptation mechanism is configured to modify the data rate by selecting a different one of a given set of predefined data rate values.

4. The WLAN transmitter of claim 3, wherein said transmission section is configured to generate BPSK (Binary Phase Shift Keying) signals, and one of said given set of predefined data rate values is 1 Mbps.

5. The WLAN transmitter of claim 3, wherein said transmission section is configured to generate QPSK (Quadrature Phase Shift Keying) signals, and one of said given set of predefined data rate values is 2 Mbps.

6. The WLAN transmitter of claim 3, wherein said transmission section is configured to generate CCK (Complementary Code Keying) signals, and one of said given set of predefined data rate values is 5.5 Mbps.

7. The WLAN transmitter of claim 3, wherein said transmission section is configured to generate CCK (Complementary Code Keying) signals, and one of said given set of predefined data rate values is 11 Mbps.

8. The WLAN transmitter of claim 2, wherein said plurality of predefined control states comprises a data rate increase state in which said control section is configured to increase the data rate.

9. The WLAN transmitter of claim 2, wherein said plurality of predefined control states comprises a data rate decrease state in which said control section is configured to decrease the data rate.

10. The WLAN transmitter of claim 2, wherein said plurality of predefined control states comprises at least one state in which said control section is configured to keep the data rate constant.

11. The WLAN transmitter of claim 1, wherein said at least two transmission parameters comprise a transmission power and at least one of said transmission parameter modification mechanisms is a transmission power adaptation mechanism.

12. The WLAN transmitter of claim 11, wherein said plurality of predefined control states comprises a transmission power increase state in which said control section is configured to increase the transmission power.

13. The WLAN transmitter of claim 12, wherein said plurality of predefined control states further comprises a transmission power decrease state in which said control section is configured to decrease the transmission power, wherein said state transition controller is configured to prevent from toggling from said transmission power increase state to said transmission power decrease state.

14. The WLAN transmitter of claim 11, wherein said plurality of predefined control states comprises a transmission power decrease state in which said control section is configured to decrease the transmission power.

15. The WLAN transmitter of claim 11, wherein said plurality of predefined control states comprises at least one state in which said control section is configured to keep the transmission power constant.

16. The WLAN transmitter of claim 11, wherein said state transition controller is capable of being instructed by means of a control signal to temporarily disable said transmission power adaptation mechanism.

17. The WLAN transmitter of claim 1, wherein said RTS/CTS threshold is a frame length limit, and said RTS/CTS mechanism is activated if the current frame length exceeds that limit.

18. The WLAN transmitter of claim 1, wherein said plurality of predefined control states comprises an RTS/CTS mechanism activation state in which said control section is configured to activate said RTS/CTS mechanism.

19. The WLAN transmitter of claim 18, wherein said control section comprises a register storing a fall back count value that is continuously increased as long as said state transition controller is in said RTS/CTS mechanism activation state, said fall back count value indicating the time duration for which said RTS/CTS mechanism is already active.

20. The WLAN transmitter of claim 19, wherein said state transition controller is configured to repetitively compare said fall back count value with a fall back limit value and leave said RTS/CTS mechanism activation state if said fall back limit value is reached.

21. The WLAN transmitter of claim 1, wherein said plurality of predefined control states comprises at least one state in which said control section is configured to deactivate said RTS/CTS mechanism.

22. The WLAN transmitter of claim 1, wherein said state transition controller is capable of being instructed by means of a control signal to temporarily disable said RTS/CTS threshold adaptation mechanism.

23. The WLAN transmitter of claim 1, wherein said plurality of predefined control states comprises a constant state in which said control section is configured to apply no transmission parameter modification mechanism at all.

24. The WLAN transmitter of claim 23, wherein said plurality of predefined control states further comprises a transmission power increase state in which said control section is configured to increase the transmission power, and a transmission power decrease state in which said control section is configured to decrease the transmission power, wherein said control section is arranged to freeze a long term filter value when stepping from said transmission power decrease state to said constant state, said long term filter value being generated from a transmission success and failure parameter on a long term basis, and wherein said state transition controller is configured to step from said constant state to said transmission power increase state dependent on a comparison of the frozen long term filter value and a current long term filter value.

25. The WLAN transmitter of claim 1, wherein said plurality of predefined control states comprises a start-up state which said state transition controller enters in a start-up or reset condition.

26. The WLAN transmitter of claim 1, wherein said transmission parameter modification mechanisms are configured to modify in each control state only one transmission parameter.

27. The WLAN transmitter of claim 1, wherein said control section comprises a short term filter connected to receive a transmission success and failure parameter and adapted to generate a short term filter value therefrom, wherein said state transition controller is configured to determine the respective next control states based on said short term filter value.

28. The WLAN transmitter of claim 27, wherein said state transition controller is configured to control said short term filter to reset its short term filter value when stepping from one control state to the next control state.

29. The WLAN transmitter of claim 28, wherein said plurality of predefined control states comprises at least one state where said reset is disabled if said state is the respective next control state.

30. The WLAN transmitter of claim 27, wherein said transmission success and failure parameter is +1 in case of a successful transmission, and −1 in case of a transmission failure.

31. The WLAN transmitter of claim 27, wherein said short term filter value is linearly dependent from said transmission success and failure parameter.

32. The WLAN transmitter of claim 27, wherein said at least two transmission parameters comprise a transmission data rate, and said state transition controller is configured to determine the respective next control state based on a comparison of said short term filter value with an upper limit value indicating to increase the data rate if said short term filter value exceeds that upper limit value.

33. The WLAN transmitter of claim 32, wherein said control section further comprises at least one long term filter connected to receive said transmission success and failure parameter and adapted to generate at least one long term filter value therefrom, said upper limit value being modified in each control state based on the respective current long term filter value.

34. The WLAN transmitter of claim 33, wherein said upper limit value is linearly dependent on said long term filter value.

35. The WLAN transmitter of claim 27, wherein said at least two transmission parameters comprise a transmission data rate, and said state transition controller is configured to determine the respective next control state based on a comparison of said short term filter value with a lower limit value indicating to decrease the data rate if said short term filter value falls below that lower limit value.

36. The WLAN transmitter of claim 27, wherein said at least two transmission parameters comprise a transmission power, and said state transition controller is configured to determine the respective next control state based on a comparison of said short term filter value with an upper power limit value indicating to decrease the transmission power if said short term filter value exceeds that upper power limit value.

37. The WLAN transmitter of claim 36, wherein said at least two transmission parameters further comprise a transmission data rate, and said state transition controller is configured to determine the respective next control state also based on a comparison of said short term filter value with an upper data rate limit value indicating to increase the data rate if said short term filter value exceeds that upper data rate limit value, wherein said upper power limit value is greater than said upper data rate limit value.

38. The WLAN transmitter of claim 1, wherein said control section comprises at least one long term filter connected to receive a transmission success and failure parameter and adapted to generate at least one long term filter value therefrom, said at least one long term filter value being modified in each control state based on the respective current transmission success and failure parameter.

39. The WLAN transmitter of claim 38, wherein said at least one long term filter comprises separate long term filters for different transmission data rates.

40. The WLAN transmitter of claim 1, wherein said control section is connected to receive at least one control signal to enable or disable at least one of said transmission parameter modification mechanisms.

41. A data communications apparatus comprising:
a transmission section configured to generate signals to be transmitted; and
a control section connected to said transmission section to control said transmission section dependent on at least two transmission parameters, said control section comprising a state transition controller configured to step through a plurality of predefined control states, wherein said at least two transmission parameters comprise an RTS/CTS (Request to Send/Clear to Send) threshold value to be used for determining whether or not to activate an RTS/CTS mechanism, and at least one of said transmission parameter modification mechanisms is an RTS/CTS threshold adaptation mechanism.
wherein said control section is configured to apply different transmission parameter modification mechanisms in different ones of the plurality of predefined control states, and
wherein said state transition controller is configured to determine a respective next one of the plurality of predefined control states based on a value indicative of whether a transmission attempt has succeeded or failed.

42. An integrated circuit chip for use in a data communications transmitter, said integrated circuit chip comprising:
a transmission circuit configured to generate signals to be transmitted; and
a control circuit connected to said transmission circuit to control said transmission circuit dependent on at least two transmission parameters, said control circuit comprising a state transition control circuit configured to step through a plurality of predefined control states, wherein said at least two transmission parameters comprise an RTS/CTS (Request to Send/Clear to Send) threshold value to be used for determining whether or not to activate an RTS/CTS mechanism, and at least one of said transmission parameter modification mechanisms is an RTS/CTS threshold adaptation mechanism,
wherein said control circuit is configured to apply different transmission parameter modification mechanisms in different ones of the plurality of predefined control states, and
wherein said state transition control circuit is configured to determine a respective next one of the plurality of predefined control states based on a value indicative of whether a transmission attempt has succeeded or failed.

43. A method of operating a data communications device for transmitting data, the method comprising:
controlling the generation of signals to be transmitted, based on at least two transmission parameters, wherein said control comprises:
stepping through a plurality of predefined control states;
applying different transmission parameter modification mechanisms in different ones of the plurality of predefined control states; and
determining a respective next one of the plurality of predefined control states based on a value indicative of whether a transmission attempt has succeeded or failed;

wherein said at least two transmission parameters comprise an RTS/CTS (Request to Send/Clear to Send) threshold value to be used for determining whether or not to activate an RTS/CTS mechanism, and at least one of said transmission parameter modification mechanisms is an RTS/CTS threshold adaptation mechanism; and
wherein the method further comprises transmitting signals generated based on said control.

44. The method of claim 43, wherein said at least two transmission parameters comprise a transmission data rate and at least one of said transmission parameter modification mechanisms is a data rate adaptation mechanism.

45. The method of claim 44, wherein said data rate adaptation mechanism is configured to modify the data rate by selecting a different one of a given set of predefined data rate values.

46. The method of claim 45, wherein said data communications device is configured to generate BPSK (Binary Phase Shift Keying) signals, and one of said given set of predefined data rate values is 1 Mbps.

47. The method of claim 45, wherein said data communications device is configured to generate QPSK (Quadrature Phase Shift Keying) signals, and one of said given set of predefined data rate values is 2 Mbps.

48. The method of claim 45, wherein said data communications device is configured to generate CCK (Complementary Code Keying) signals, and one of said given set of predefined data rate values is 5.5 Mbps.

49. The method of claim 45, wherein said data communications device is configured to generate CCK (Complementary Code Keying) signals, and one of said given set of predefined data rate values is 11 Mbps.

50. The method of claim 44, wherein said plurality of predefined control states comprises a data rate increase state in which the data rate is increased.

51. The method of claim 44, wherein said plurality of predefined control states comprises a data rate decrease state in which the data rate is decreased.

52. The method of claim 44, wherein said plurality of predefined control states comprises at least one state in which the data rate is kept constant.

53. The method of claim 43, wherein said at least two transmission parameters comprise a transmission power and at least one of said transmission parameter modification mechanisms is a transmission power adaptation mechanism.

54. The method of claim 53, wherein said plurality of predefined control states comprises a transmission power increase state in which the transmission power is increased.

55. The method of claim 54, wherein said plurality of predefined control states further comprises a transmission power decrease state in which the transmission power is decreased, wherein no toggling is possible between said transmission power increase state and said transmission power decrease state.

56. The method of claim 53, wherein said plurality of predefined control states comprises a transmission power decrease state in which the transmission power is decreased.

57. The method of claim 53, wherein said plurality of predefined control states comprises at least one state in which the transmission power is kept constant.

58. The method of claim 53, wherein said transmission power adaptation mechanism can temporarily be disabled.

59. The method of claim 43, wherein said RTS/CTS threshold is a frame length limit, and said RTS/CTS mechanism is activated if the current frame length exceeds that limit.

60. The method of claim 43, wherein said plurality of predefined control states comprises an RTS/CTS mechanism activation state in which said RTS/CTS mechanism is activated.

61. The method of claim 60, wherein said control further comprises:
storing a fall back count value; and
continuously updating said fall back count value as long as said RTS/CTS mechanism activation state is active,
wherein said fall back count value indicates the time duration for which said RTS/CTS mechanism is already active.

62. The method of claim 61, wherein said control further comprises:
repetitively comparing said fall back count value with a fall back limit value and leaving said RTS/CTS mechanism activation state if said fall back limit value is reached.

63. The method of claim 43, wherein said plurality of predefined control states comprises at least one state in which said RTS/CTS mechanism is deactivated.

64. The method of claim 43, wherein said RTS/CTS threshold adaptation mechanism can be temporarily disabled.

65. The method of claim 43, wherein said plurality of predefined control states comprises a constant state in which no transmission parameter modification mechanism is applied at all.

66. The method of claim 65, wherein said plurality of predefined control states further comprises a transmission power increase state in which the transmission power is increased, and a transmission power decrease state in which the transmission power is decreased,
wherein said control further comprises freezing a long term filter value when stepping from said transmission power decrease state to said constant state, said long term filter value being generated from a transmission success and failure parameter on a long term basis, and
wherein said stepping is configured to step from said constant state to said transmission power increase state dependent on a comparison of the frozen long term filter value and a current long term filter value.

67. The method of claim 43, wherein said plurality of predefined control states comprises a start-up state which is entered in a start-up or reset condition.

68. The method of claim 43, wherein said transmission parameter modification mechanisms are configured to modify in each control state only one transmission parameter.

69. The method of claim 43, wherein said control further comprises:
operating a short term filter receiving a transmission success and failure parameter and generating a short term filter value therefrom,
wherein the respective next control states are determined based on said short term filter value.

70. The method of claim 69, wherein operating said short term filter comprises:
resetting said short term filter value when stepping from one control state to the next control state.

71. The method of claim 70, wherein said reset is disabled if the respective next control state is a predefined state.

72. The method of claim 69, wherein said transmission success and failure parameter is +1 in case of a successful transmission, and −1 in case of a transmission failure.

73. The method of claim 69, wherein said short term filter value is linearly dependent from said transmission success and failure parameter.

74. The method of claim 69, wherein said at least two transmission parameters comprise a transmission data rate, and the respective next control state is determined based on a comparison of said short term filter value with an upper limit value indicating to increase the data rate if said short term filter value exceeds that upper limit value.

75. The method of claim 74, wherein said control further comprises:
operating at least one long term filter receiving said transmission success and failure parameter and generating at least one long term filter value therefrom, said upper limit value being modified in each control state based on the respective current long term filter value.

76. The method of claim 75, wherein said upper limit value is linearly dependent on said long term filter value.

77. The method of claim 69, wherein said at least two transmission parameters comprise a transmission data rate, and the respective next control state is determined based on a comparison of said short term filter value with a lower limit value indicating to decrease the data rate if said short term filter value falls below that lower limit value.

78. The method of claim 69, wherein said at least two transmission parameters comprise a transmission power, and the respective next control state is determined based on a comparison of said short term filter value with an upper power limit value indicating to decrease the transmission power if said short term filter value exceeds that upper power limit value.

79. The method of claim 78, wherein said at least two transmission parameters further comprise a transmission data rate, and the respective next control state is determined also on the basis of a comparison of said short term filter value with an upper data rate limit value indicating to increase the data rate if said short term filter value exceeds that upper data rate limit value, wherein said upper power limit value is greater than said upper data rate limit value.

80. The method of claim 43, wherein said control further comprises:
operating at least one long term filter receiving a transmission success and failure parameter and generating at least one long term filter value therefrom, said at least one long term filter value being modified in each control state based on the respective current transmission success and failure parameter.

81. The method of claim 80, wherein said at least one long term filter comprises separate long term filters for different transmission data rates.

82. The method of claim 43, wherein said control further comprises:
receiving at least one control signal to enable or disable at least one of said transmission parameter modification mechanisms.

* * * * *